US 6,637,810 B2

(12) United States Patent
Kisiler et al.

(10) Patent No.: US 6,637,810 B2
(45) Date of Patent: Oct. 28, 2003

(54) HOOD TRIM STRIP

(75) Inventors: Mark Kisiler, Raymond, OH (US); Ryan Joseph Phillips, Dublin, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/109,961

(22) Filed: Mar. 29, 2002

(65) Prior Publication Data
US 2003/0184125 A1 Oct. 2, 2003

(51) Int. Cl.[7] ................................................ B60J 10/08
(52) U.S. Cl. ..................... 296/206; 286/207; 286/146.9
(58) Field of Search ................. 296/194, 206, 296/207, 76, 146.9, 93, 96.21; 180/69.2, 69.21, 69.22, 69.23; 362/487, 496; 16/86 R, 86 A, 86 B; 267/140.4, 152, 153; 49/498.1

(56) References Cited

U.S. PATENT DOCUMENTS

| 2,671,935 A | * | 3/1954 | Flues |
| 3,413,389 A | | 11/1968 | Footner |
| 4,419,844 A | | 12/1983 | Kreisfeld |
| 5,149,169 A | | 9/1992 | Nozaki |
| 5,154,952 A | | 10/1992 | Nozaki |
| 5,482,348 A | * | 1/1996 | Mass et al. ............... 296/207 |
| 5,682,667 A | | 11/1997 | Flagg |
| 5,725,924 A | | 3/1998 | Keys |
| 5,735,511 A | | 4/1998 | Stocker et al. |
| 6,039,388 A | | 3/2000 | Choi |
| 6,318,795 B1 | | 11/2001 | Pyo |
| 6,331,068 B1 | * | 12/2001 | Chase ....................... 362/549 |

FOREIGN PATENT DOCUMENTS

| DE | 3731263 | * | 11/1988 | ................. 296/76 |
| FR | 2705308 | * | 11/1994 | ................. 296/207 |
| JP | 3-164385 | * | 7/1991 | ................. 296/206 |
| JP | 4-300788 | * | 10/1992 | ................. 296/76 |
| JP | 5-238426 | * | 9/1993 | ................. 180/69.2 |

* cited by examiner

Primary Examiner—Stephen T. Gordon
Assistant Examiner—H. Gutman
(74) Attorney, Agent, or Firm—Rankin, Hill, Porter & Clark LLP; Christen Millard

(57) ABSTRACT

A vehicle hood seal and stopper assembly protects a hood, grill, grill insert, and headlight during closing of the hood. The seal and stopper assembly is secured to a lower surface of the hood and includes a primary seal member and a plurality of stopper members. The stopper members are integrally secured to a lower surface of the primary seal member and are provided in spaced apart locations along the primary seal member. The primary seal member is more resilient than the stopper members, and the stopper members serve to limit hood motion during over stroke of the hood. When the hood is closed, the stopper members are disposed between the hood and the grill insert, the forward surface of the seal member provides a continuous seal between the hood and the subjacent structure, and the seal and stopper assembly is disposed relatively behind a forward edge of the hood so as to be concealed.

17 Claims, 4 Drawing Sheets

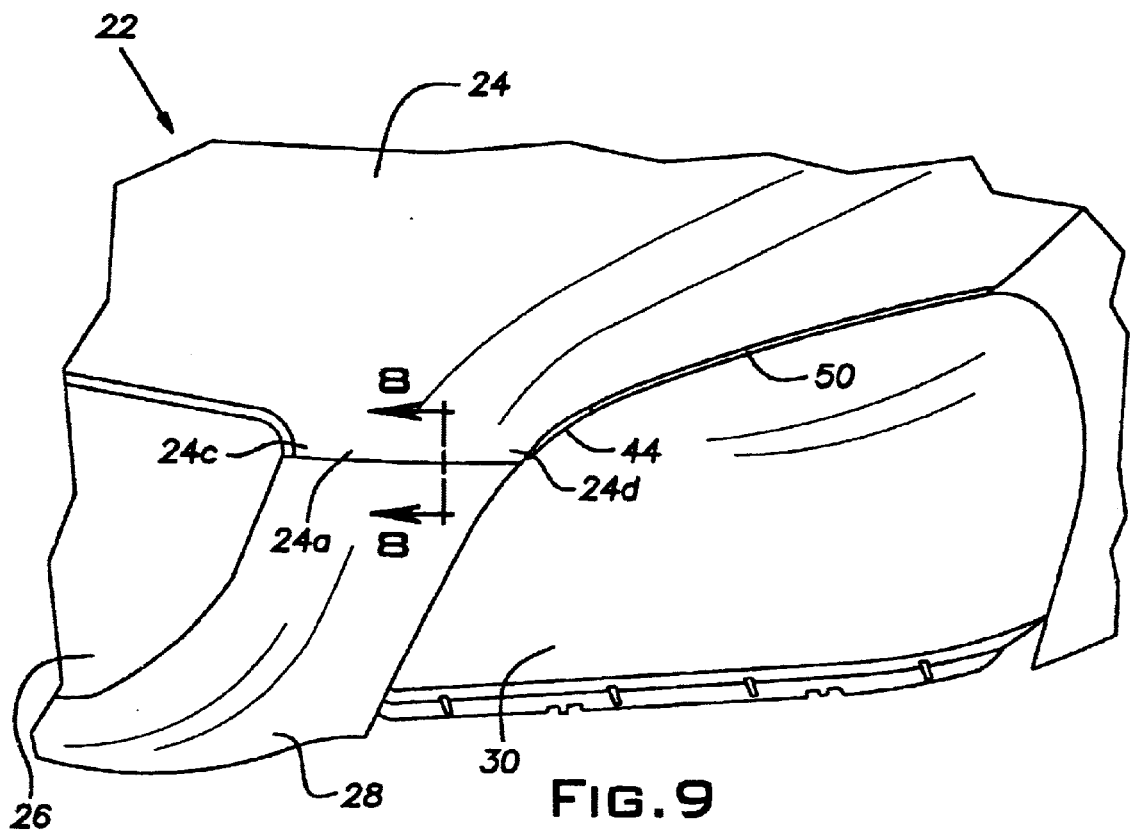
FIG. 9
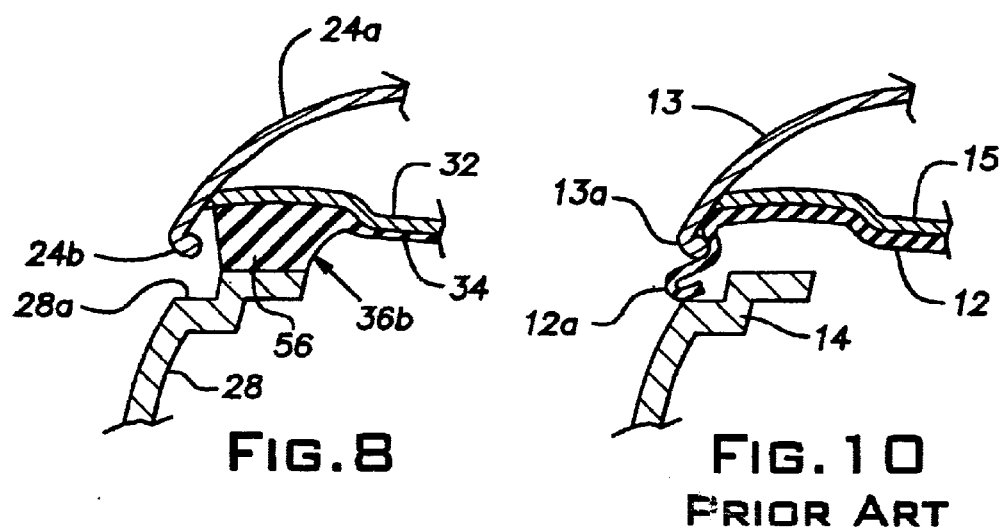
FIG. 8
FIG. 10
PRIOR ART

HOOD TRIM STRIP

BACKGROUND OF THE INVENTION

1. Field of the Invention

The present invention generally relates to vehicle seals and trim strips and, more particularly, toward vehicle hood seals and trim strips.

2. Description of Related Art

With reference to FIG. 10, a conventional hood seal 12 is shown to be located generally between the forward edge 13a of the hood 13 and the upper surface of the grill insert or frame 14. The prior art hood seal 12 is attached to a lower surface of the hood frame 15, and extends through a gap between the hood 13 and the grill insert 14. The forward edge 12a of the seal 12 projects from the forward edge 13a of the hood 13, and is clearly visible as a dark band when the hood 13 is closed. However, for aesthetic purposes it is desirable to have as little of the seal as possible visible from the front of the vehicle when the hood is closed. This is especially true at the gap between two painted surfaces, such as the hood 13 and the grill insert 14. Therefore, the conventional hood seal shown in FIG. 10 is undesirable.

Vehicle hoods have special requirements due to the manner in which the hood is closed and latched, and these special requirements have resulted in seals, like that shown in FIG. 10, which are relatively enlarged and protrude from the hood and grill insert when the hood is closed.

More specifically, in order to ensure that the hood striker engages the latch on the front of the vehicle, the hood must be permitted to travel further than would otherwise be necessary. This extra travel of the hood during closing is referred to in the art as "over stroke". However, when the vehicle hood over strokes it may contact the grill and the paint on the hood or grill area may be chipped from the force of impact. Also, since the headlights are often located immediately under the hood, the headlights can be cracked or otherwise damaged due to the impact of the hood.

Several solutions have been proposed in response to this problem. One proposed solution places stops at the corners of the grill area or hood. Examples of such stops are shown in U.S. Pat. Nos. 6,039,388, 6,318,795, 5,682,667, and 5,735,511. Additionally, examples of seals are shown in U.S. Pat. Nos. 5,725,924, 5,149,169, and 5,154,952. Moreover, some known seals are made of multiple materials, such as shown in U.S. Pat. Nos. 3,413,389 and 4,419,844.

None of the known stops or seals works satisfactorily to solve the competing interests of hood seals: to be as invisible as possible when the hood is closed while preventing damage to the vehicle during over stroke. In the past, this conflict has been settled in favor of providing seals that protrude from the closed hood, to the detriment of the appearance of the vehicle. Accordingly, there exists a need in the art for an improved hood seal and trim strip that provides sufficient protection against over slamming while being generally unexposed at gaps between painted surfaces.

SUMMARY OF THE INVENTION

The present invention is directed toward a hood seal and stopper assembly that prevents or minimizes damage to the paint, grill, headlights, grill insert, and hood when the hood is closed, and which improves the aesthetic appearance of the front end of the vehicle when the hood is closed.

In accordance with the present invention, a vehicle hood seal and stopper assembly includes a primary seal member and a plurality of stopper members. The primary seal member has a proximal end, a distal end, and a front edge. The stopper members are integrally formed with a lower surface of the primary seal member, and are disposed at spaced apart locations between the proximal and distal ends of the primary seal member.

In further accordance with the present invention, the primary seal member has a first thickness and the stopper members have a second thickness that is greater than the first thickness. Forming relatively thicker stopper members causes the stopper members to be relatively more rigid than the primary seal member.

In further accordance with the present invention, a secondary seal member is secured to the proximal end of the primary seal member. The secondary seal member includes a bulbous forward edge and a rearwardly extending flange-like member.

In further accordance with the present invention, the seal and stopper assembly is secured to a lower surface of a hood, and is received between the grill insert, the headlight, and the hood. The stopper members engage the grill insert and serve to limit the over stroke past the nominal position in hard close situations. The proximal end of the primary seal member is secured to a secondary seal member. The primary and secondary seal members include a bulbous forward edge that is disposed between the hood and the headlight.

BRIEF DESCRIPTION OF THE DRAWINGS

These and further features of the invention will be apparent with reference to the following description and drawings, wherein:

FIG. 9 is a front perspective view of a corner of the vehicle with the hood in the closed position; and, FIG. 10 is a cross-sectional view of a hood, seal, and grill insert according to the prior art.

DETAILED DESCRIPTION OF THE PREFERRED EMBODIMENTS

Figure 1:
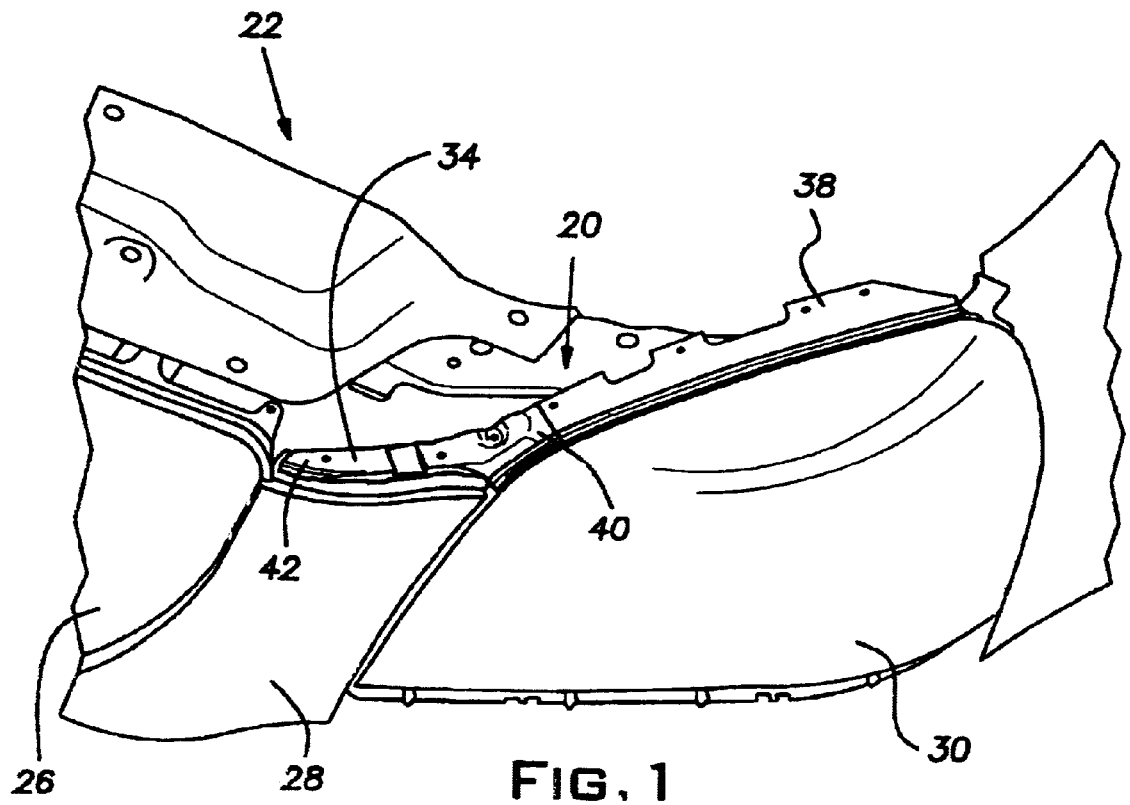
FIG. 1 is a schematic perspective view of a portion of a vehicle with a seal and stopper assembly according to the present invention, with the hood removed for clarity.

With reference to the drawing figures, an improved seal and stopper assembly 20 according to the present invention is illustrated in position on a vehicle 22. In the drawings, the seal and stopper assembly 20 is shown in relation to only one front side of the vehicle 22, including a hood 24, a grill 26, a grill insert or grill frame 28, and a headlight 30. It is considered clear that an identical seal and stopper assembly is provided on the opposite side of the vehicle.

In vehicles of the type depicted, it is desirable for styling purposes to have the front corners 24a of the hood 24 project downwardly so as to be at least partially received between the grill insert 28 and the headlight 30, and so that the front edge 24b of the hood 24 is disposed vertically adjacent the upper edge 28a (shown in FIG. 8) of the grill insert 28. Accordingly, the front corners 24a of the hood 24 have rather sharp bends or corners at areas generally overlying the union of the grill 26 and grill insert 28 (hereinafter referred to as a first hood bend 24c) and the union of the grill insert 28 and the headlight 30 (hereinafter referred to as a second hood bend 24d). It is at these bends 24c, 24d that the risk of damaging contact is especially great due to the potential for point contact between the hood 24 and the grill 26, grill insert 28, and/or headlight 30.

The stopper and seal assembly 20 is secured to the hood frame 32 at each of the hood front corners 24a so as to be positioned at least at or near the first and second bends 24c, 24d, as will be described more fully hereinafter. The stopper and seal assembly 20 includes a primary seal member 34, a plurality of stopper members 36a, 36b, 36c, and a secondary seal member 38. While the primary seal member 34 and the plurality of stopper members 36a, 36b, 36c are described herein separately, it is understood that they are preferably integrally molded, preferably by injection molding, as a unitary or one-piece assembly. Alternatively, the stopper members may be separate members integrally secured to the primary seal member by insert molding, or secured to the primary seal member by adhesive bonding, vibration welding, ultrasonic welding, or the like. The secondary seal member 38 extends from the primary seal member 34 and may be secured thereto by adhesive bonding, heat welding, vibration welding, or the like. Alternatively, the secondary seal member 38 may be integrally molded with the primary seal member 34 and stopper members.

The primary seal member 34 is formed from a suitable material, such as ethylene-propylene-diene terpolymer (EPDM) rubber, and has a thickness such that the primary seal member 34 is relatively flexible or pliable so as to provide good sealing performance when the hood 24 is closed. The stopper members 36a, 36b, 36c are likewise formed from a suitable material, such as EPDM, but have a greater thickness such that the stopper members are relatively stiffer or firmer than the primary seal member 34. Accordingly, the stopper members 36a, 36b, 36c are provided to absorb impacts during over stroke of the hood 24, and prevent the hood 24 from contacting the subjacent grill 26, grill insert 28, and headlight 30. Naturally, the secondary seal member 38 is formed from the same material as the primary seal member and stopper members, or a compatible and comparable material, so as to facilitate edge-to-edge bonding of the primary and secondary seal members 34, 38 to define a unitary or integrated stopper and seal assembly 20. The secondary seal members 38 have a thickness similar to that of the primary seal members 34. However, it is noted that the bonding of the primary and secondary seal members 34, 38, while preferred, is not required by the present invention and may be omitted in some installations.

Figure 3:
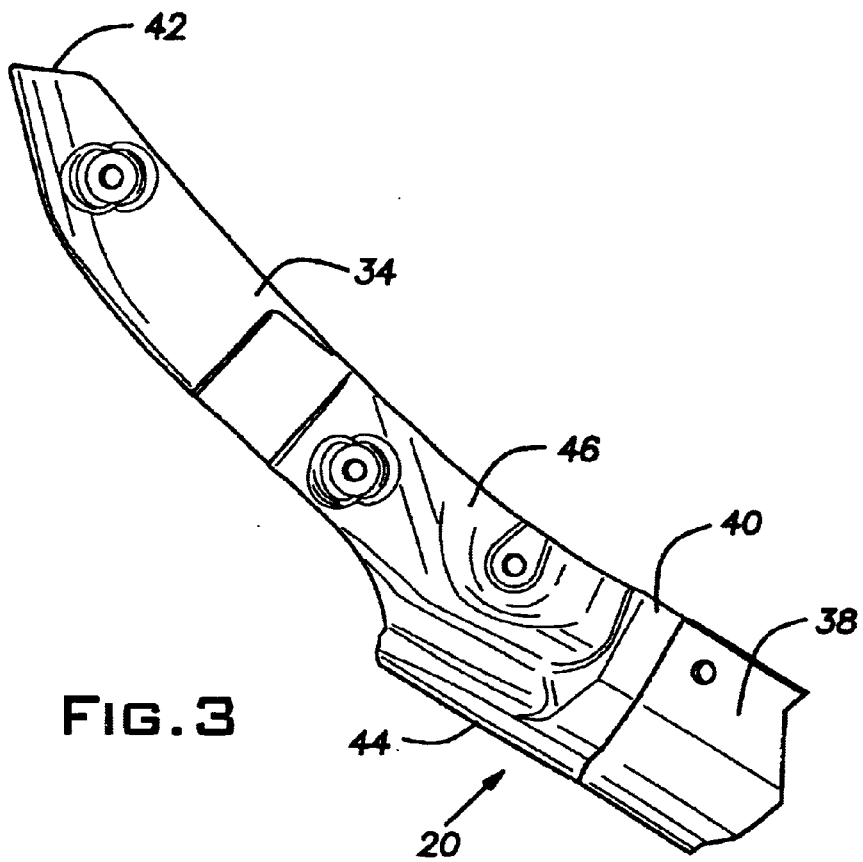
FIG. 3 is a top plan view of the primary seal member and a portion of a secondary seal member.
Figure 5:
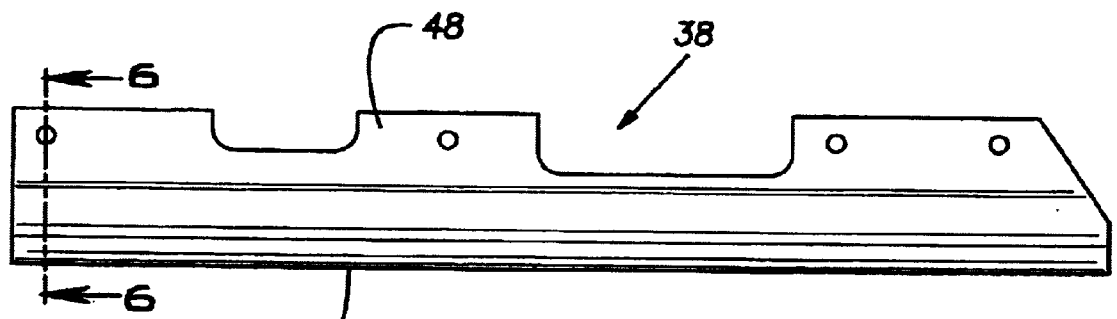
FIG. 5 is a top plan view of the secondary seal member.
Figure 6:
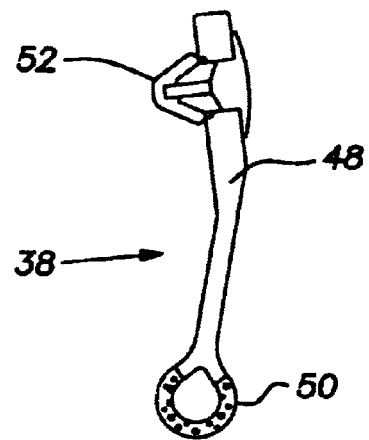
FIG. 6 is a cross section of the secondary seal member as seen along line 6—6 of FIG. 5.
Figure 7:
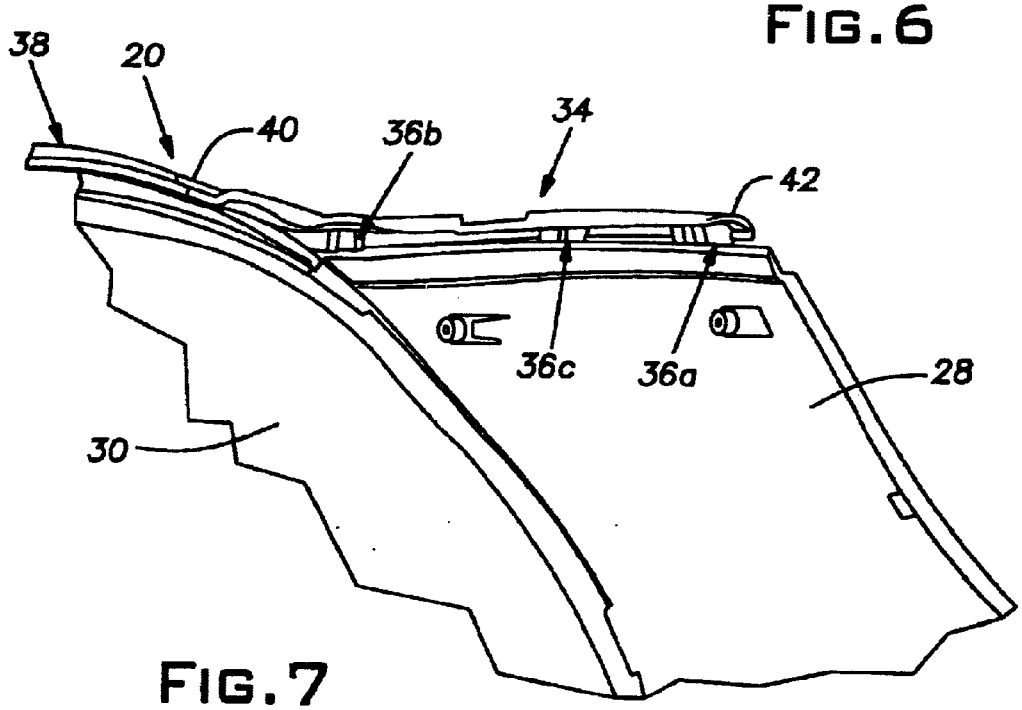
FIG. 7 is a rear elevational view of the vehicle and the integrated seal and stopper assembly of the present invention, with the hood removed for clarity; and, FIG. 8 is a cross sectional view, generally as seen along line 8—8 of FIG. 9.

The primary seal member 34 includes a first or proximal end 40 and an opposite, distal or second end 42. The proximal end 40 of the primary seal member includes a bulbous forward edge 44 and a rearwardly extending flange-like portion 46. The rearwardly extending flange-like portion 46 is shaped to conform to the contour or shape of the hood frame 32. The proximal end 40 of the primary seal member 34 is integrally formed with or otherwise bonded (FIGS. 1, 3) to an edge of the secondary seal member 38, which, as shown best in FIGS. 5 and 6, also has a flange-like rearwardly extending portion 48 and a bulbous forward edge 50. When the hood 24 is closed, the bulbous forward edge 44 of the primary seal member 34 extends away from the second bend 24d and overlies an edge of the headlight 30. Similarly, the bulbous forward edge 50 of the secondary seal member 38 extends along the length of the headlight 30 (FIG. 9). Due to the fact that the hood 24 and headlight 30 are formed of different materials, and have different colors and textures, the protruding bulbous edges 44, 50 of the seal members 34, 38, which has been exaggerated in FIG. 9 for purposes of clarity, is not considered to be aesthetically offensive.

Adjacent the proximal end 40, the primary seal member 34 transitions into an extension that is specially adapted to conform to the shape of the hood corner 24a (i.e., hood frame 32) overlying the grill insert 28. Relative to the previously described proximal end 40, the extension essentially consists of the flange-like portion, but lacks the bulbous forward edge. A series of openings are provided along the length of the primary seal member 34 through which fasteners, such as resilient clips 52 (FIG. 6), extend to secure the integrated seal and stopper assembly 20 to the lower surface of the hood frame 32.

As noted previously, in the illustrated host vehicle the risk of damaging. contact between the hood 24 and the subjacent vehicle components is increased at sharp bends of the hood. Accordingly, the stopper members 36a, 36b, 36c are strategically located at these damage-susceptible areas.

Figure 2:
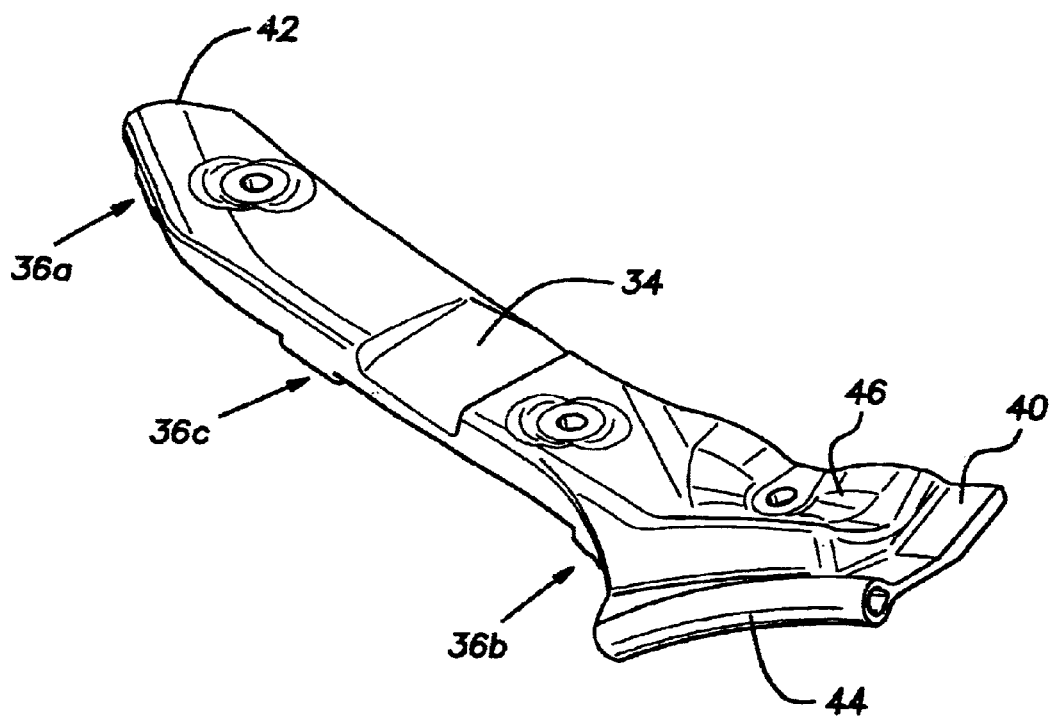
FIG. 2 is a top view of the primary seal member.
Figure 4:
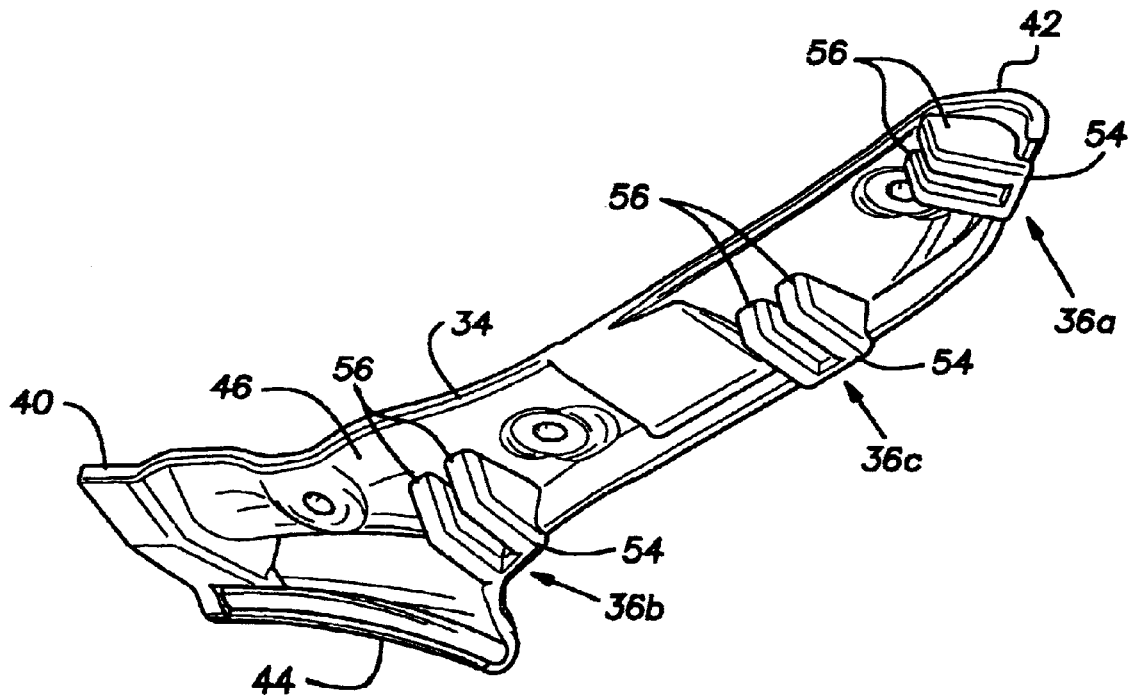
FIG. 4 is a bottom perspective view of the primary seal member and stopper members.

With particular reference to FIG. 4, the stopper members are shown to extend downwardly from the primary seal member 34. In the illustrated embodiment, first, second, and third stopper members 36a, 36b, 36c are provided, each of the stopper members being generally U-shaped and having a base or leg portion 54 coextensive with a front edge of the primary seal member and a pair of rearwardly extending and spaced apart arms 56. Accordingly, the front edge of the primary seal member extends between adjacent stopper members so as to define a continuous downwardly extending surface, best seen in FIG. 2, that will seal the gap between the hood and subjacent grill when the hood is closed, to be described hereinafter. The spaced apart arms 56 extend rearwardly and terminate at a location generally forward of the rearward edge of the primary seal member 34. The stopper members have a thickness that is greater than the thickness of the primary seal member, as illustrated. More specifically, the primary seal member 34 has a thickness of preferably between about 2–4 mm and, more preferably about 3 mm, while the stopper members have a thickness of between about 4–8 mm and, more preferably about 6 mm. The arms 56 of the stopper members have a width of about 4–8 mm and, more preferably, about 6 mm, and are spaced apart a distance between about 2–4 mm and, more preferably about 3 mm.

The first stopper member 36a is located generally adjacent the first bend 24c in the hood 24 and, thus, is disposed adjacent the union of the grill 26 and the grill insert 28. The second stopper member 36b is located generally adjacent the second bend 24d in the hood 24 and, thus, is disposed adjacent the union of grill insert 28 and the headlight 30, and near the first or proximal end 40 of the primary seal member 34. The third stopper member 36c is disposed between the first and second stopper members 36a, 36b at a location generally corresponding to a mid-point of the grill insert 28, and serves to protect the subjacent grill insert 28 should the hood corner 24a deflect during over stroke.

With reference to FIGS. 8 and 9, the improvement provided by the present invention will be apparent. FIG. 9 shows that, when the hood 24 is in the closed position, the seal and stopper assembly 20 is not visible through the gap between the hood corner 24a and the grill insert 28. FIG. 8 illustrates a cross sectional view through the hood corner 24a and the second stopper member 36b. The second stopper member 36b is disposed between the hood frame 32 and the grill insert 28, but is disposed behind the front edge 24b of the hood 24, and is therefore concealed in use. The second stopper arm 56 is shown to have a length that is generally equal to a length of the upper surface of the grill insert 28, to provide maximum surface area for absorption of impacts during over stroke. The forward surface of the seal member extends between and seals the gap between the hood frame 32 and the upper surface of the grill insert 28. Accordingly, the seal and stopper assembly 20 of the present invention provides a clean and aesthetically pleasing appearance while completely sealing the interface between the hood and subjacent structure.

Moreover, the provision of a seal and stopper assembly 20 wherein the seal members 34, 38 are relatively more resilient and the other members 36a, 36b, 36c are relatively stiffer is advantageous in the present structural application. The resilience or softness of the seal members 34, 38 serves to cushion the impact of the hood during over slamming, and to provide good sealing properties, particularly along the interface of the hood 24 and the headlight 30. The stiffness or rigidity of the other members 36a, 36b, and 36c, while being compressible to a certain extent to absorb hood impact, also serves to limit movement of the hood 24 toward the grill 26, grill insert 28, and headlight 30. As such, the stopper members 36a, 36b, 36c prevent potentially damaging contact when the hood 24 is over slammed.

In the foregoing, the seal and stopper assembly 20 has been described with reference to a particular host vehicle. As such, the seal and stopper assembly 20 is shaped and configured to correspond to the host vehicle. The exact positioning and size of the seal and stopper assembly 20 is governed by considerations of the vehicle design. For example, the hood shape, the position of the hood, and the position of the grill, grill insert, and headlight are governed by styling considerations. Furthermore, the position of the hood frame relative to the hood and grill, grill insert, and other subjacent structure is governed by functional considerations, notably protection of the engine from debris damage. Accordingly, the seal and stopper assembly 20 must extend and fill the entire space between the hood and the subjacent structure. Therefore, it is considered clear that the seal and stopper assembly 20 of the present invention is not limited to the specific structure described and illustrated herein, but rather may be readily adapted by one skilled in the art to accommodate any particular vehicle structure.

What is claimed is:

1. A vehicle hood seal and stopper assembly comprising a primary seal member and a plurality of stopper members, said primary seal member having a proximal end, a distal end, and a forward surface, said stopper members being integrally formed with said primary seal member and extending downwardly from said primary seal member, said stopper members being disposed in spaced apart locations between said proximal and distal ends of said primary seal member, wherein said primary seal member is relatively more resilient than said stopper members, and said forward surface of said primary seal member extends between said stopper members.

2. The vehicle hood seal and stopper assembly according to claim 1, wherein said primary seal member has a first thickness dimension and said stopper members have a second thickness dimension, said first thickness dimension being less than the second thickness dimension.

3. The vehicle hood seal and stopper assembly according to claim 1, wherein said stopper members have a forward edge that is generally coextensive with the forward surface of the primary seal member.

4. The vehicle hood seal and stopper assembly according to claim 3, wherein the forward surface of the primary seal member at the proximal end is relatively enlarged to define a bulbous portion.

5. The vehicle hood seal and stopper assembly according to claim 1, wherein a secondary seal member is secured to the proximal end of said primary seal member, said secondary seal member including a bulbous forward edge and a rearwardly extending flange-like member.

6. The vehicle hood seal and stopper assembly according to claim 5, wherein said primary seal member and said stopper members are integrally formed in an injection molding process from at least one material, said primary seal member having a first thickness dimension and said stopper members having a second thickness dimension, said first thickness dimension being less than the second thickness dimension.

7. The vehicle hood seal and stopper assembly according to claim 5, wherein said stopper members have a forward edge that is generally coextensive with the forward surface of the primary seal member.

8. The vehicle hood seal and stopper assembly according to claim 7, wherein the forward surface of the primary seal member at the proximal end is relatively enlarged to define a bulbous portion.

9. A vehicle assembly comprising a hood, a grill insert, a headlight adjacent the grill insert, and a seal and stopper assembly, said seal and stopper assembly being secured to a lower surface of said hood rearwardly adjacent a forward edge of said hood, said seal and stopper assembly comprising a primary seal member and a plurality of stopper members, said primary seal member having a proximal end, a distal end, and a forward edge, said stopper members being integrally attached to a lower surface of said primary seal member and being disposed in spaced apart locations between said proximal and distal ends of said primary seal member, said stopper members being adapted to engage said grill insert and thereby limit movement of said hood toward said grill insert and said headlight during closing of said hood.

10. The vehicle assembly according to claim 9, wherein, when said hood is in a closed position, a gap is formed between the forward edge of said hood and said grill insert, said stopper members being disposed between said hood and said grill insert and relatively rearwardly of said forward edge of said hood so as to be generally concealed.

11. The vehicle assembly according to claim 10, wherein said primary seal member and said stopper members are integrally formed in an injection molding process, said primary seal member having a first thickness and said stopper members having a second thickness, said second thickness being greater than said first thickness such that said stopper members are relatively more rigid than said primary seal member.

12. The vehicle assembly according to claim 10, wherein said stopper members have a forward edge that is generally coextensive with the forward edge of the primary seal member.

13. The vehicle assembly according to claim 9, wherein the forward edge of the primary seal member at the proximal end is relatively enlarged to define a bulbous portion, said bulbous portion being disposed between said forward edge of said hood and said headlight.

14. The vehicle assembly according to claim 9, wherein a secondary seal member is secured to the proximal end of said primary seal member, said secondary seal member including a bulbous forward edge and a rearwardly extending flange-like member, said secondary seal member bulbous forward edge being received between the forward edge of the hood and the headlight.

15. The vehicle assembly according to claim 14, wherein said primary seal member has a first thickness dimension and said stopper members have a second thickness dimension, said first thickness dimension being less than the second thickness dimension.

16. The vehicle assembly according to claim 14, wherein said stopper members have a forward edge that is generally coextensive with the forward edge of the primary seal member.

17. The vehicle assembly according to claim 16, wherein the forward edge of the primary seal member at the proximal end is relatively enlarged to define a bulbous portion.

* * * * *